(12) United States Patent
Sweney et al.

(10) Patent No.: US 10,008,704 B2
(45) Date of Patent: Jun. 26, 2018

(54) THERMAL SHIELD FOR PREVENTING THERMAL RUNAWAY IN A BATTERY ASSEMBLY

(71) Applicant: Faster Faster Inc., San Francisco, CA (US)

(72) Inventors: Robert Wayne Sweney, San Francisco, CA (US); Andres Diego Gonzalez, San Francisco, CA (US)

(73) Assignee: Faster Faster Inc., Brisbane, CA (US)

( * ) Notice: Subject to any disclaimer, the term of this patent is extended or adjusted under 35 U.S.C. 154(b) by 434 days.

(21) Appl. No.: 14/806,372

(22) Filed: Jul. 22, 2015

(65) Prior Publication Data

US 2016/0028059 A1  Jan. 28, 2016

Related U.S. Application Data

(60) Provisional application No. 62/028,953, filed on Jul. 25, 2014.

(51) Int. Cl.
| | | |
|---|---|---|
| *H01M 2/12* | (2006.01) | |
| *H01M 10/0525* | (2010.01) | |
| *H01M 2/10* | (2006.01) | |
| *H01M 10/658* | (2014.01) | |
| *H01M 2/20* | (2006.01) | |
| *H01M 10/42* | (2006.01) | |

(52) U.S. Cl.
CPC ....... *H01M 2/1264* (2013.01); *H01M 2/1077* (2013.01); *H01M 2/1241* (2013.01); *H01M 2/1252* (2013.01); *H01M 10/0525* (2013.01); *H01M 10/658* (2015.04); *H01M 2/206* (2013.01); *H01M 10/425* (2013.01); *H01M 2220/20* (2013.01)

(58) Field of Classification Search
CPC ............. H01M 2/1264; H01M 10/658; H01M 2/1252; H01M 2/1077; H01M 2/1241; H01M 10/0525; H01M 10/425; H01M 2/206; H01M 2220/20
USPC .......................................................... 429/87
See application file for complete search history.

(56) References Cited

U.S. PATENT DOCUMENTS

| | | |
|---|---|---|
| 2005/0170238 A1 | 8/2005 | Abu-Isa et al. |
| 2009/0111015 A1 | 4/2009 | Wood et al. |
| 2011/0039142 A1 | 2/2011 | Kwag et al. |
| 2011/0091749 A1* | 4/2011 | Chow ................. H01M 2/1252 429/50 |
| 2012/0121949 A1 | 5/2012 | Eberhard et al. |
| 2013/0323558 A1 | 12/2013 | Darch et al. |
| 2013/0344376 A1* | 12/2013 | Asaida ................ H01M 2/1077 429/156 |

OTHER PUBLICATIONS

PCT International Search Report and Written Opinion, PCT Application No. PCT/US2015/041795, dated Oct. 19, 2015, 13 pages.

* cited by examiner

*Primary Examiner* — Gary Harris
(74) *Attorney, Agent, or Firm* — Fenwick & West LLP

(57) ABSTRACT

A battery assembly includes a thermal shield. The thermal shield protects battery cells in the battery assembly from hot gases vented by a neighboring cell experiencing thermal runaway. The thermal shield acts as a one-way valve, allowing the cell experiencing thermal runaway to properly vent away hot gases, but still protecting the rest of the cells in the battery pack from the hot gases.

13 Claims, 12 Drawing Sheets

THERMAL SHIELD FOR PREVENTING THERMAL RUNAWAY IN A BATTERY ASSEMBLY

CROSS-REFERENCE TO RELATED APPLICATIONS

This application claims the benefit of U.S. Provisional Patent Application No. 62/028,953 filed on Jul. 25, 2014, which is incorporated by reference in its entirety.

BACKGROUND

1. Field of Technology

The embodiments herein relate generally to protecting battery cells. More specifically, the embodiments herein relate to using thermal shields to prevent thermal runaway events.

2. Description of the Related Art

Electric vehicles require high energy density rechargable batteries in order to have performance and range comparable to internal combustion engine (ICE) vehicles. This usually requires individual battery cells to be packed in a tight configuration. However, rechargeable batteries have the potential to experience thermal runaway, resulting in a dangerous situation when packed tightly together. Thermal runaway can be caused by external or internal stimuli. External stimuli may include elevated temperatures or physical puncturing of the cell. Internal stimuli may include manufacturing defects (such as some kind of conductive debris) or lithium plating/dendrite formation between electrodes (usually tied to over discharge or abuse during charging). Under such failure, a common rechargeable lithium ion cell can reach temperatures in excess of 700 degrees Celsius and release hot gas and flame (i.e., cause fire). If this battery is part of a multi-cell "pack," neighboring cells and surrounding materials absorb the generated heat. A neighboring second cell may overheat and also go into thermal runaway following the first cell, creating a dangerous chain reaction. The gas released by a cell in runaway also has the potential to melt the crimp seals of neighboring cells. The crimp seal separates the positive and negative cell terminals, and a melted crimp seal would cause the cell to short circuit and also experience thermal runaway.

Current battery pack designs combine insulators and heat spreading mechanisms to manage heat flow safely. However, the crimp seals of neighboring cells are still vulnerable to being melted by hot vented gas. Therefore, there is a need for a device and method to protect the neighboring cells from hot vented gas.

SUMMARY

A thermal shield protects battery cells in a battery pack from hot gases vented by a neighboring cell experiencing thermal runaway. The thermal shield acts as a one-way valve, allowing the cell experiencing thermal runaway to properly vent away hot gases, but still protecting the rest of the cells in the battery pack from the hot gases. In some embodiments, the thermal shield is made of a flame and heat resistant paper and is designed to deform only in one direction in order to act as a one-way valve.

In one embodiment, a battery module frame with a hexagonal profile holds a plurality of individual battery cells in close proximity while still providing sufficient thermal isolation between the cells. The hexagonal profile of the frame advantageously creates a thin air gap between the cells, utilizing the air gap as a thermal insulator. The hexagonal profile of the frame also reduces the overall amount of material use, reducing the overall mass of the battery module frame. Finally, the hexagonal profile of the frame allows the sides of the frame to flex, compensating for variations in the outer dimensions of the battery cells.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Electric vehicles often use lithium ion batteries as the main form of energy storage to power the electric vehicle. Lithium ion batteries offer a relatively high energy density relative to other forms of rechargeable batteries. However, lithium ion batteries are also susceptible to experiencing thermal runaway due to various internal or external stimuli. During a thermal runaway event, the internals of the cell may combust and generate hot gas. In order to prevent pressure building inside the cell, many manufacturers incorporate a safety vent that allows the hot gas to be released in a controlled manner. The battery cells in electric vehicles are usually arranged with little room in between each cell in order to increase the energy density of the overall battery pack. This makes neighboring cells more susceptible to the hot gas vented by a cell experiencing thermal runaway. In one aspect, a thin thermal shield is used to protect the neighboring cells from the hot vented gas. Although the following figures and embodiments are described with respect to an electric vehicle such as an electric motorcycle, various other embodiments comprise other vehicles or applications such as electric cars or electronic devices.

Figure 1:
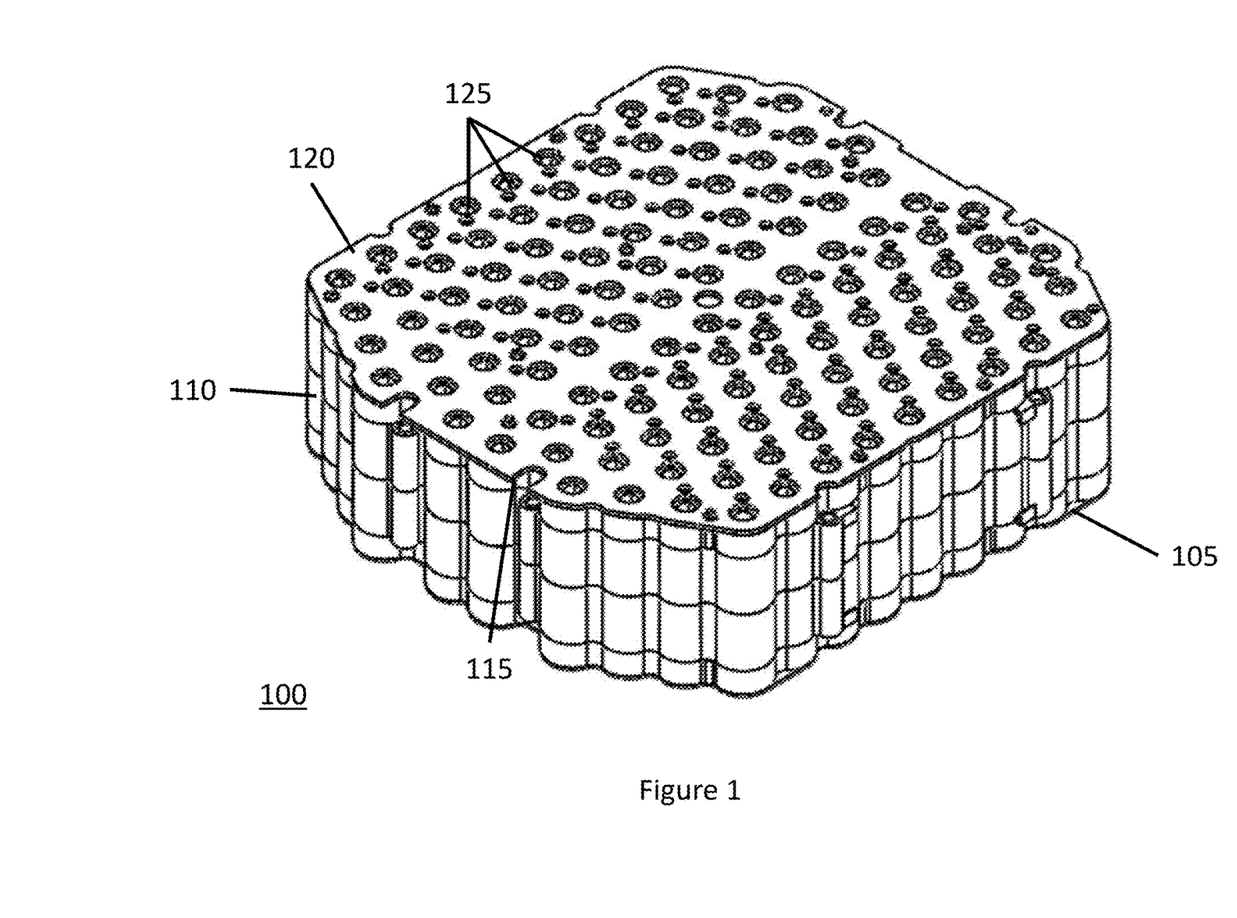
FIG. 1 is a perspective view of a battery module assembly according to one embodiment.

FIG. 1 is a perspective view of a battery module assembly according to one embodiment. The battery module assembly 100 comprises a baseplate 105, a battery module frame 110, a thermal shield 115, a battery cell stop 120, and a plurality of battery cells 125. In some embodiments, the baseplate 105 is an aluminum sheet. The baseplate 105 may be anodized or otherwise coated in order to electrically insulate the baseplate 105 from the cells 125. In other embodiments, the baseplate 105 may be made of other materials, such as plastic, steel, or a composite material. The battery module frame 110 is a frame designed to hold a plurality of cells 125, as described below with reference to FIG. 2A and FIG. 2B. The thermal shield 115 is a thin sheet of material designed to protect the plurality of cells 125 from hot vented gas, as described below with reference to FIG. 5A and FIG. 5B. The battery cell stop 120 is a flat sheet with holes formed into the battery cell stop 120 to allow access to the cells 125, as described below with reference to FIG. 6A. The plurality of cells 125 are cylindrical battery cells as described below with reference to FIG. 3.

The baseplate 105 is mounted flush against the bottom of the battery module frame 110. The plurality of cells 125 reside in the battery module frame 110. The thermal shield 115 is mounted flush against the top of the battery module frame 110, and the battery cell stop 120 sits on top of the thermal shield 115. The battery cell stop 120 is fixed to the battery module frame 110, holding the thermal shield 115 in place on the battery module frame 110. In some embodiments, the battery cell stop 120 is fixed to the battery module frame 110 using fasteners such as screws. In other embodiments, the battery cell stop 120 is fixed to the battery module frame 110 using other fastening methods, such as rivets, bolts, heat staking posts, or adhesives.

Figure 2A:
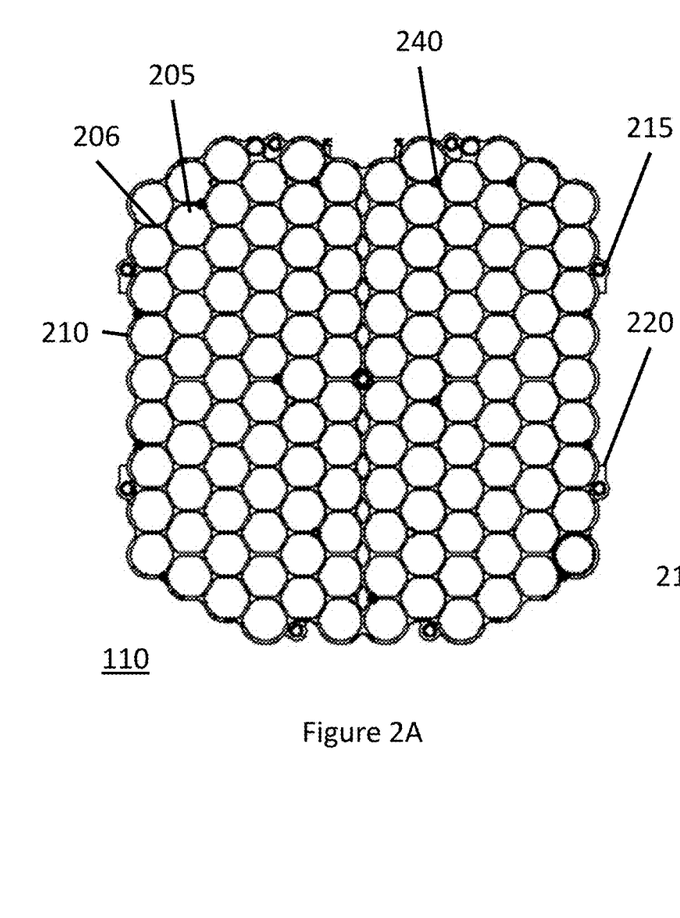
FIGS. 2A and 2B are a top view and perspective view of a battery module frame according to one embodiment.
Figure 2B:
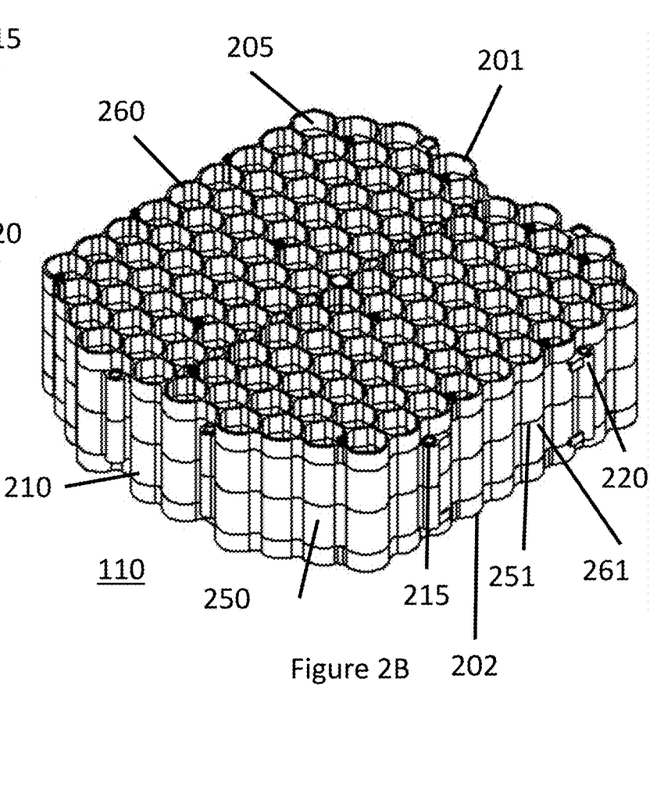

FIGS. 2A and 2B respectively illustrate a plane view and a perspective view of the battery module frame 110 according to one embodiment. The battery module frame 110 comprises a top surface 201, a bottom surface 202, a plurality of battery pockets 205, an outer surface 210, a plurality of mounting holes 215, handle slots 220, and battery cell stop mounting holes 240. The battery pockets 205 are cylindrical or hexagonal cavities formed into the frame 110 that are sized to accept a battery cell 125. In some embodiments, the frame 110 comprises 126 battery pockets 205 shown in FIG. 2. Each battery pocket includes a first end and a second end where the second end is positioned opposite the first end. In other embodiments, the frame 110 may comprise more or fewer battery pockets 205 than shown in FIG. 2. The battery pockets 205 are separated by partitions 206. Each partion 206 is a thin wall of material formed into the frame 110 as a result of forming the battery pockets 205. In some embodiments, the partitions 206 are made as thin as possible in order to minimize the distance between cells 125. It is advantageous to minimize the distance between cells 125 because a closer cell-to-cell distance results in a higher energy density of the overall battery pack. However, as described below, the partitions 206 must be made of a material that is resistant to heat and flame so as to resist deterioration in the event of a cell 125 experiencing thermal runaway. In some embodiments, the battery pockets 205 extend from the top surface 201 to the bottom surface 202 of the frame 110. In other embodiments, the battery pockets 205 may not extend all the way to the bottom surface 202.

The plurality of mounting holes 215 are cylindrical cavities formed into the outer surface 210 of the frame 110. The plurality of mounting holes 215 allow the frame 110 to be secured to another object using fasteners. In some embodiments, the battery cell stop mounting holes 240 are holes formed into the top surface 201 of the frame 110 between a plurality of battery pockets 205. The battery cell stop mounting holes 240 allow a fastener, such as a thread cutting screw, to be inserted into the battery cell stop mounting holes 240 to secure the battery cell stop 120 to the frame 110. In some embodiments, the battery cell stop mounting holes 240 extend 10 mm or less into the frame 110. In some embodiments, the frame 110 comprises additional material around each battery cell stop mounting hole 240, because the partitions 206 are too thin to fully encompass each battery cell stop mounting hole 240. The handle slots 220 are grooves formed into the side of the outer surface 210 of the frame 110. In other embodiments, the handle slots 220 comprise a hook-shaped feature having a first portion that extends perpendicularly from the outer surface 210 and a second portion extending perpendicularly from the first portion such that the open side of the hook faces downward. In some embodiments, a carrying handle can be inserted into the handle slot 220, enabling easier handling of the entire battery module assembly 100. In some embodiments, the battery module frame 110 further comprises a top frame half 260 and a bottom frame half 250. The top frame half 260 comprises an inner surface 261, and the bottom frame half comprises an inner surface 251. The inner surface 261 of the top frame half 260 is joined to the inner surface 251 of the bottom frame half 250. In some embodiments, the top frame half 260 is identical to the bottom frame half 250.

Figure 2C:
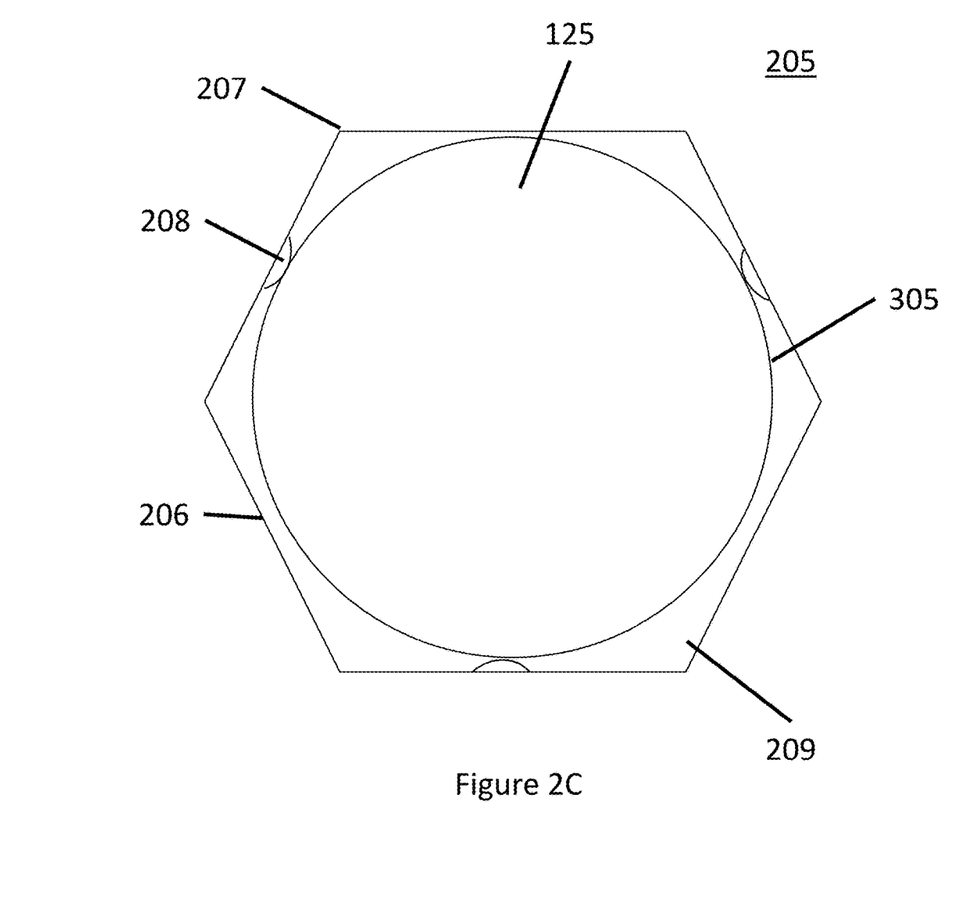
FIG. 2C is a top view of one pocket in the frame according to one embodiment.
Figure 2D:
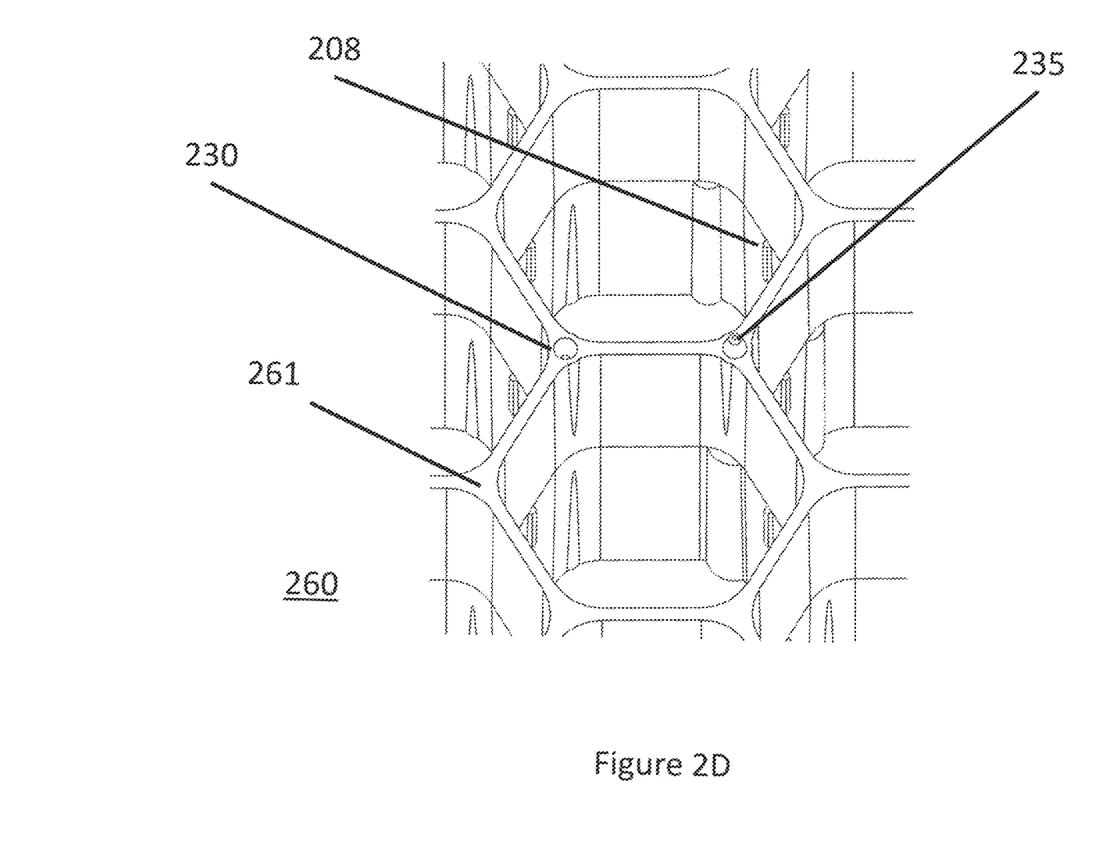
FIG. 2D is a detailed view of one half of a battery module frame according to one embodiment.

FIG. 2D depicts the inner surface 261 of top frame half 260, however, all descriptions below in reference to FIG. 2D may apply to the bottom frame half 250 as well. In some embodiments, the top frame half 260 and bottom frame half 250 each comprise a plurality of alignment holes 230 and alignment pins 235. In some embodiments, the alignment holes 230 and alignment pins 235 are conical in shape and extend from the inner surface 261. In some embodiments, the alignment holes 230 and alignment pins 235 may serve to align the top frame half 260 to the bottom frame half 250, while the top frame half 260 and bottom frame half 250 are secured together by a friction fit between each frame half and each of the plurality of cells 125. In other embodiments, the alignment holes 230 and alignment pins 235 may be designed for a friction fit, such that the top frame half 260 and bottom frame half 250 are secured together by the friction of the alignment holes 230 and alignment pins 235.

Referring back to FIGS. 2A and 2B, in some embodiments, the battery module frame 110 is made of injection molded plastic. In other embodiments, the battery module frame 110 may be made of various other materials, such as aluminum alloy, carbon fiber composite, or other plastics. In general the material used to make the battery module frame 110 battery module frame has thermally and electrically insulating properties, so as to prevent heat transfer from cell to cell and to reduce the likelihood of short circuiting between cells. Furthermore, the material used to make the battery module frame 110 is resistant to heat and fire, such that the frame 110 does not melt or otherwise deform when a cell 125 experiences thermal runaway. Therefore, in some embodiments, the battery module frame 110 may be made of a plastic with a bead or fiber fill in order to help maintain structural integrity when heated.

FIG. 2C is a top view of a single battery pocket 205 of the battery module frame 110, showing a battery cell 125 in the pocket 205. In some embodiments, each battery pocket 205 includes six partitions 206 and six corners 207 such that the interior surface of each battery pocket 205 is in the shape of a hexagonal cylinder. In some embodiments, each battery pocket 205 further comprises a plurality of ribs 208 that protrude from the partitions 206. In some embodiments, the ribs 208 do not extend the full height of the frame 110. In some embodiments, the top frame half 260 and bottom frame half 250 each have ribs 208, and the ribs 208 extend less than a quarter of the total height of each frame half, as depicted in FIG. 2D. Referring back to FIG. 2C, in some embodiments, the ribs 208 are partially circular in cross section. In other embodiments, the ribs 208 may be various other shapes, such as triangular. The ribs 208 contact outer surface 305 of the battery cell 125, centering the battery cell 125 in the battery pocket 205 and maintaining an air gap 209 between the battery cell 125 and the frame 110. In some embodiments, the ribs 208 secure the cell 125 in place via friction. In some embodiments, the ribs 208 are designed to crush or collapse upon insertion of the cell 125 into the battery pocket 205. One or more of the friction of the ribs 208, the crushing of the ribs 208, or the flexing of the thin partitions 206 as described below may all contribute to securing the cell 125 inside the battery pocket 205. It is advantageous to use a frame 110 with hexagonal battery pockets 205 and ribs 208 because the resulting air gap 209 thermally insulates each battery cell 125 from its neighboring battery cells. Thus, if one battery cell 125 experiences thermal runaway, it will transfer less heat to its neighboring battery cells through the intervening sides of the battery pocket. Additionally, it is advantageous to use a frame 110 with hexagonal battery pockets 205 because the thin partitions 206 of each battery pocket 205 are better able to flex and deform, providing additional compliance to account for variability in the outer dimensions of the battery cells 125. Finally, it is advantageous to use a frame 110 with hexagonal battery pockets 205 because the battery module frame 110 uses less material, therefore reducing cost and weight of the battery module frame 110. Although the battery pocket 205 is described above and depicted as having six partitions 206 and three ribs 208, other embodiments may have more or fewer sides and ribs.

Figure 3:
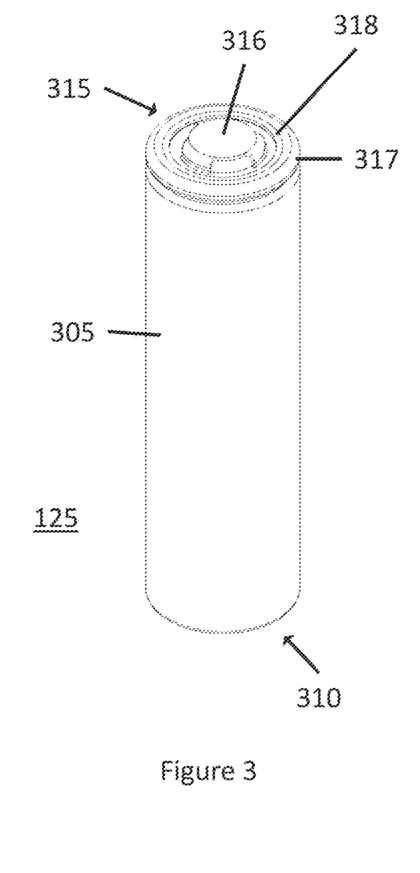
FIG. 3 is a perspective view of a battery cell according to one embodiment.

FIG. 3 is a perspective view of a battery cell according to one embodiment. The battery cell 125 comprises a cylindrical outer surface 305, a bottom surface 310, and a top surface 315. The top surface 315 further comprises a positive cap 316, a negative crimp 317, and a crimp seal 318 between the positive cap 316 and the negative crimp 317. The crimp seal 318 electrically isolates the positive cap from the negative crimp 317. Thus, the positive and negative terminals of the battery cell 125 are both on the same end of the battery cell 125. In some embodiments, the crimp seal 318 is made of a non-conductive material such as plastic and is susceptible to breaking down under heat and flame. Therefore, it is advantageous to protect the crimp seal 318 from excessive heat that may be generated during thermal runaway of a neighboring cell 125, as described below with reference to FIG. 7. In some embodiments, the battery cell 125 is a lithium ion battery cell with an 18650 form factor. In other embodiments, the battery cell 125 is a different variety of rechargeable battery, such as a nickel cadmium or nickel metal hydride battery cell.

Figure 4A:
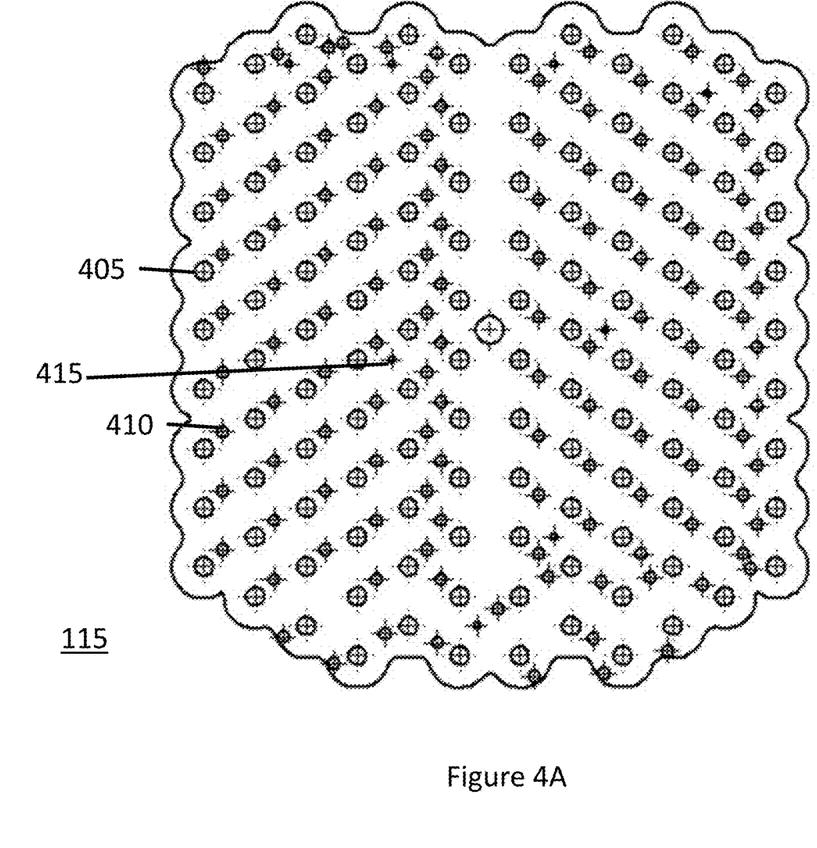
FIG. 4A is a top view of a thermal shield according to one embodiment.

FIG. 4A is a top view of a thermal shield according to one embodiment. The thermal shield 115 is a sheet of material with positive cap access holes 405, negative crimp access holes 410, and mounting holes 415 formed into the thermal shield 115. In some embodiments, the thermal shield 115 comprises 126 positive cap access holes 405 and 126 negative crimp access holes 410. In other embodiments, the thermal shield 115 may comprise more or fewer positive cap access holes 405 and negative crimp access holes 410. In some embodiments, the thermal shield 115 comprises 19 mounting holes 415. In other embodiments, the thermal shield 115 may comprise more or fewer mounting holes 115. The size of the positive cap access holes 405 allow a wire to be electrically connected to the positive cap 316 of each battery cell 125. The negative crimp access holes 410 allow a wire to be electrically connected to the negative crimp 317 of each battery cell 125. In some embodiments, the thermal shield 115 protects the top of each cell 125 from hot gas that may be vented from a neighboring cell experiencing thermal runaway. However, the thermal shield 115 preferably must also be able to deform in order to allow the cell experiencing thermal runaway to properly vent the generated gases. Therefore, in some embodiments, the positive cap access holes 405 are patterned as described below with reference to FIG. 4B. In some embodiments, the thermal shield 115 is made of a heat and flame resistant paper. In other embodiments, the thermal shield 115 may be made from other heat and flame resistant materials, such as aramid fiber or a plastic. The mounting holes 415 allow the fasteners used to secure the battery cell stop 120 to the frame 110 to pass through the thermal shield 115. It is advantageous to use a thin thermal shield 115 in a battery module assembly 110 because the thermal shield 115 protects the battery cells 125 from hot vented gases while adding minimal weight and complexity to the overall assembly. It is also advantageous to use a thermal shield 115 in a battery module assembly 110 because it allows a cell experiencing thermal runaway to engage all of its safety features, including its thermal shutdown separator, current-interrupt-device and pressure vent without endangering the neighboring cells. Battery cell safety features are well understood in the related field and will not be further described herein.

Figure 4B:
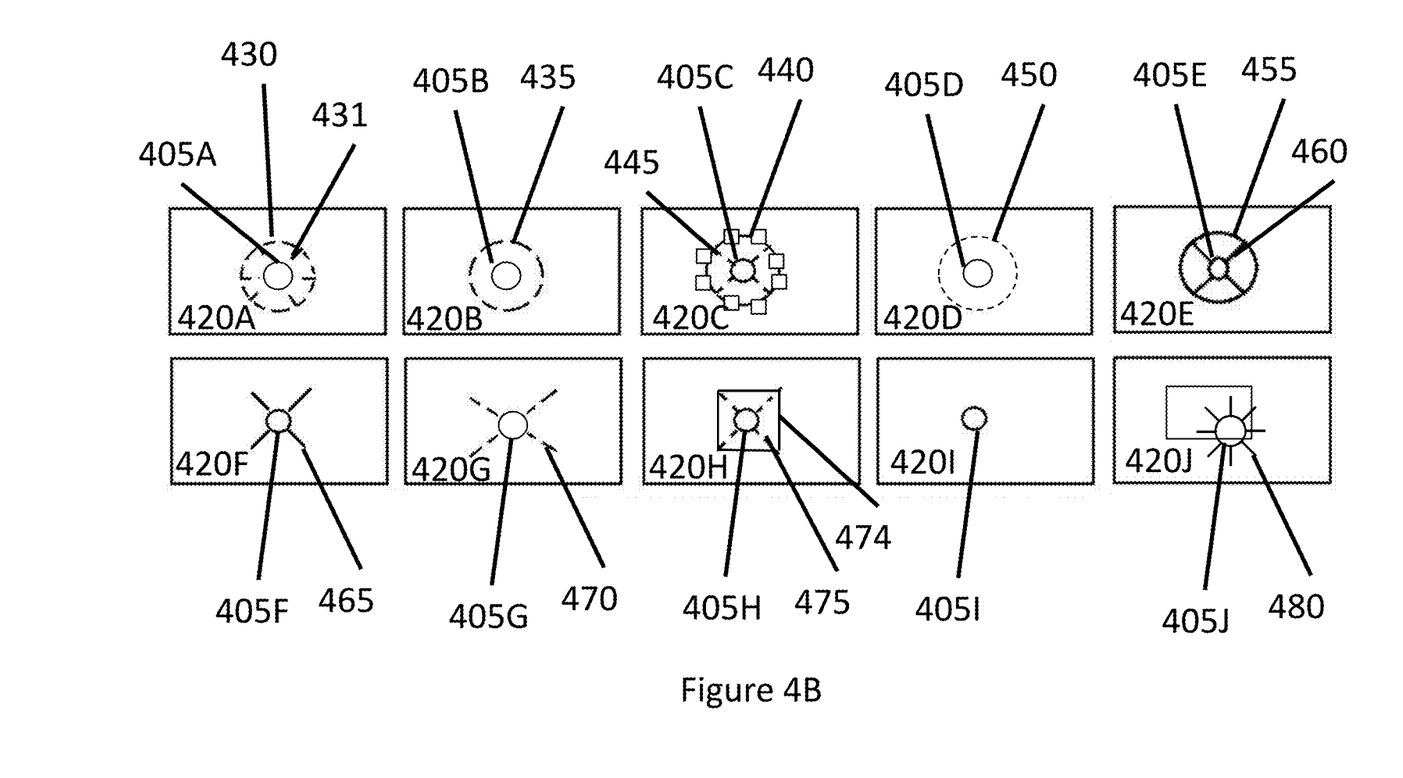
FIG. 4B depicts various embodiments of thermal shield positive cap access hole patterns.

FIG. 4B depicts various embodiments of thermal shield positive cap access hole patterns. In FIG. 4B, a solid line represents a scored (e.g., cut) section and a dashed line represents a perforated section. Hole patterns 420A-420J all have a positive cap access hole 405 in the center and a perforated pattern cut into the thermal shield. The positive cap access hole 405 is a through hole that is punched or otherwise formed through the entire thickness of the thermal shield 115. However, the perforated and scored patterns around the positive cap access hole 405 may vary according to different embodiments. In some embodiments, the purpose of the perforated and scored patterns around the positive cap access hole 405 is to allow the thermal shield 115 to deform or tear in the direction away from the positive cap 316 of the cell 125 when the cell 125 vents hot gas. On the other hand, the thermal shield 115 should not deform or tear in the direction towards the positive cap 316 of the cell 125 when a neighboring cell vents hot gas. Therefore, the positive cap access hole pattern 420 acts as a one-way valve, allowing gas to vent away from the cell 125 but not allowing gas from a neighboring cell to flow towards the cell 125. The operation of the thermal shield 115 as a one-way valve is further described below with respect to FIG. 7. In some embodiments, the diameter of the positive cap access hole 405 is slightly smaller than the diameter of the positive cap 405 of the cell 125. Thus, when a force is exerted on the thermal shield 115 in the direction of the positive cap 405 of the cell 125, the thermal shield 115 contacts and is supported by the positive cap 405 of the cell 125. In some embodiments, the negative crimp access holes 410 are through holes and do not act as a one-way valve. However, in other embodiments, the negative crimp access holes 410 may have patterns similar to those described above with reference to FIG. 4B and may similarly act as a one-way valve.

In the descriptions of hole patterns 420A-420J below, the term "perforation" and its variants refers to a cut pattern in the thermal shield 115 that comprises an alternating pattern of an incision followed by an uncut section of material. The term "cut" refers to a continuous incision. The hole pattern 420A comprises a positive cap access hole 405A, a perforated perimeter 430, and a plurality of radial cuts 431. The perforated perimeter 430 is circular and concentric with the positive cap access hole 405A. Each radial cut 431 extends from the perforated perimeter 430 towards the positive cap access hole 405A such as towards the center of the positive cap access hole 405A.

In some embodiments, the radial cuts 431 do not fully extend to the positive cap access hole 405A. For example, hole pattern 420B comprises a positive cap access hole 405B and a perforated perimeter 435. The perforated perimeter 435 is circular and concentric to the positive cap access hole 405B. Compared to hole pattern 420A, hole pattern 420B lacks radial cuts 431.

Hole pattern 420C comprises a positive cap access hole 405C, a perforated perimeter 440, and radial perforations 445. The perforated perimeter 440 is circular and concentric to the positive cap access hole 405C. The radial perforations 445 extend from the perforated perimeter 440 toward to the positive cap access hole 405C. The hole pattern 420D comprises a positive cap access hole 405D and a perforated perimeter 450, similar to the hole pattern 420B. However, the performated perimeter 450 of hole pattern 420D is more finely perforated than the perforated perimeter 435. Hole pattern 420E comprises a positive cap access hole 405E, a creased perimeter 455, and radial cuts 460. The creased perimeter 455 is circular in shape and concentric to the positive cap access hole 405E. The creased perimeter 455 may be indented, folded, or otherwise formed into the thermal shield 115 such that the creased perimeter 455 creates a weak spot in the thermal shield 115 that enables to thermal shield 115 to fold, but not tear, at the creased perimeter 460. The radial cuts 460 extend from the creased perimeter 455 centrally toward the positive cap access hole 460.

Hole pattern 420F comprises a positive cap access hole 405F and radial cuts 465. The radial cuts 465 extend radially outward from the positive cap access hole 405F. As shown in FIG. 4B, hole pattern 420F lacks a perimeter as shown in the previous hole patterns described above. Hole pattern 420G comprises a positive cap access hole 405G and radial perforations 470. The radial perforations 470 extend radially outward from the positive cap access hole 405G. Hole pattern 420G lacks a perimeter.

Hole pattern 420H comprises a positive cap access hole 405H, a creased perimeter 474, and radial perforations 475. The creased perimeter 474 is similar to the creased perimeter 455 described above with reference to hole pattern 420E, except the creased perimeter 474 comprises a square outline that is further conducive to the thermal shield 115 folding. The radial performations 575 extend from the corners of the creased perimeter 455 to the positive cap access hole 405H.

Hole pattern 420I comprises only a positive cap access hole 405I. Hole pattern 420J comprises a positive cap access hole 405J and radial cuts 480. The radial cuts 480 extend radially outward from the positive cap access hole 405J.

Figure 4C:
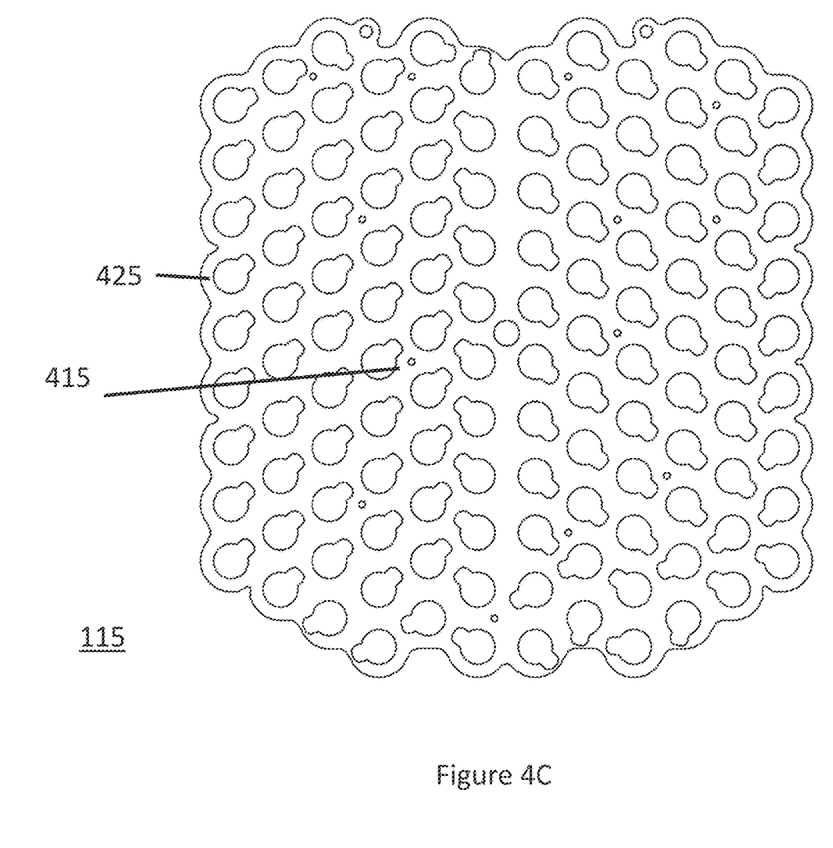
FIG. 4C depicts an alternative embodiment of the thermal shield.

FIG. 4C depicts an alternative embodiment of the thermal shield 115 depicted in FIG. 4A. This particular embodiment of the thermal shield 115 comprises a plurality of cell access holes 425 and mounting holes 415. The cell access holes 425 are shaped to allow a wire to be electrically connected to the positive cap 316 of each battery cell 125 and a wire to be electrically connected to the negative crimp 317 of each battery cell 125. In some embodiments, the cell access holes 425 are shaped to combine the functionality of both the positive cap access hole 405 and negative crimp access hole 410 as described above with reference to FIG. 4A.

Figure 5:
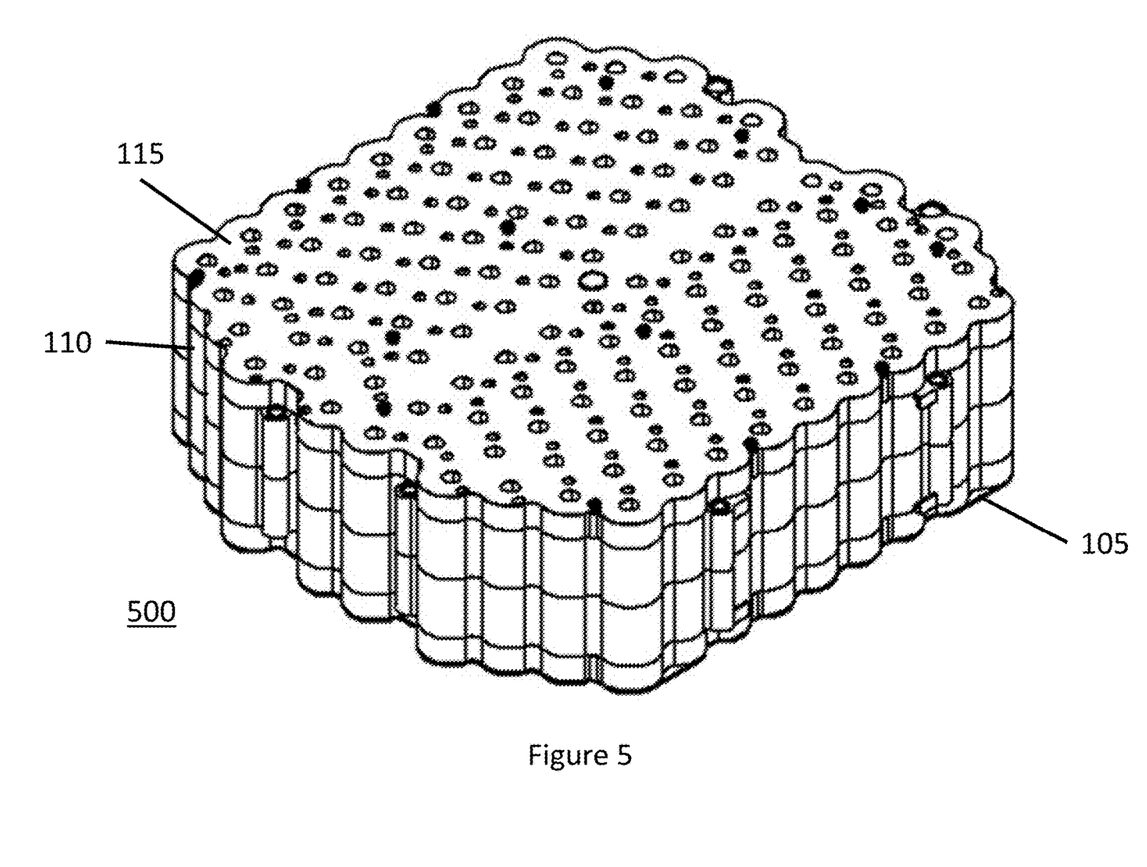
FIG. 5 is a perspective view of a partial battery module frame assembly according to one embodiment.

FIG. 5 is a perspective view of a partial battery module assembly according to one embodiment. The partial battery module assembly 500 comprises a baseplate 105 over the second ends of the battery pockets and in contact with the battery frame module 110, the battery module frame 110, and the thermal shield 115 over the first ends of the battery pockets and in contact with the battery frame module 110. The baseplate 105 is described above with reference to FIG. 1. The battery module frame 110 is described above with reference to FIG. 2A and FIG. 2B. The thermal shield 115 is described above with reference to FIG. 4A and FIG. 4B. The thermal shield 115 rests flat against the top of the battery module frame 110. In some embodiments, the thermal shield 115 is not directly secured to the battery module frame 110. Instead, the thermal shield 115 is clamped between the battery cell stop 120 and the battery module frame 110, as described above with reference to FIG. 1.

Figure 6A:
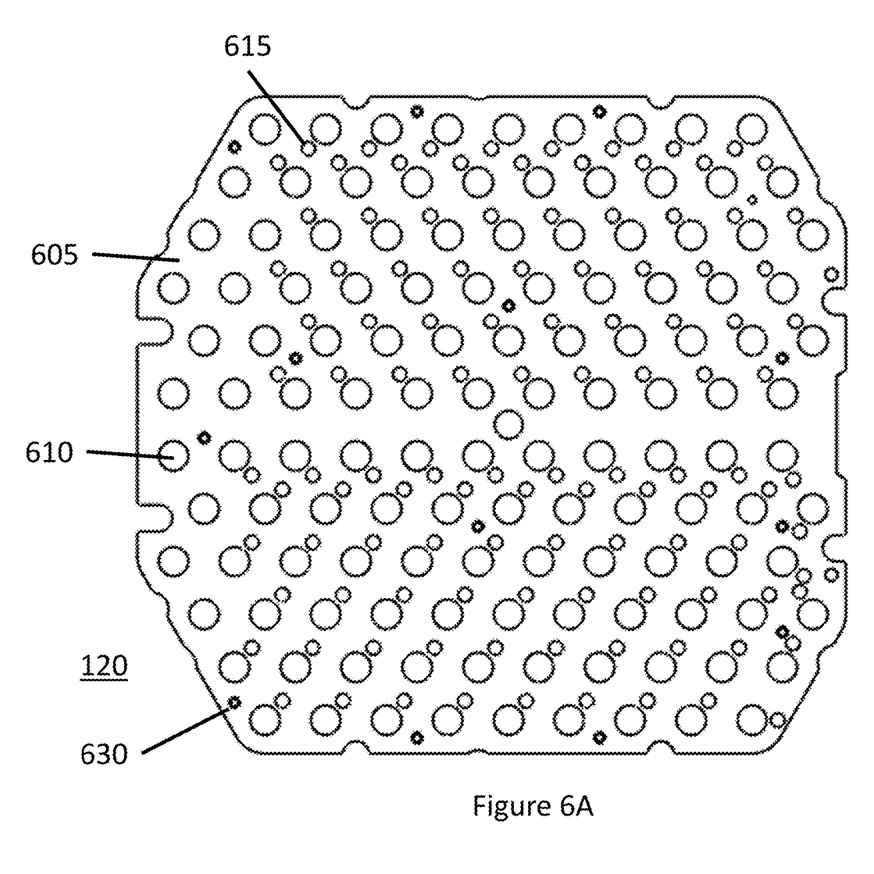
FIG. 6A is a top view of a battery cell stop implemented as a printed circuit board according to one embodiment.
Figure 6B:
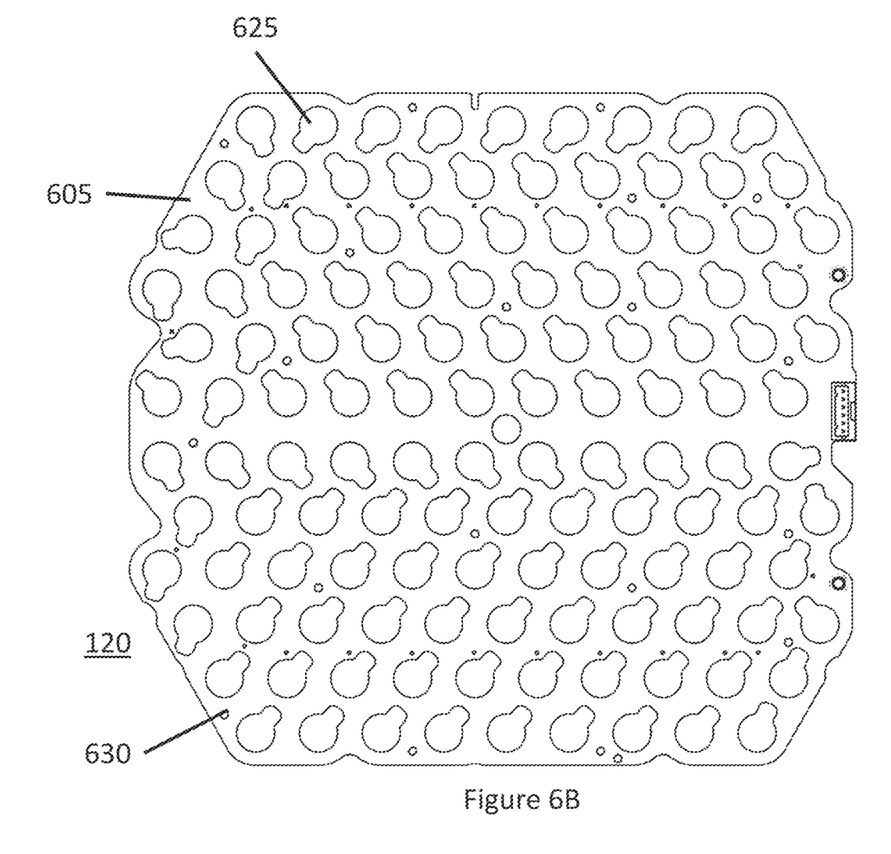
FIG. 6B depicts an alternative embodiment of the battery cell stop.

FIG. 6A is a battery cell stop according to one embodiment implemented as a printed circuit board. The battery cell stop 120 comprises a sheet 605 with positive cap access holes 610 and negative crimp access holes 615 formed into the flat sheet 605. The positive cap access holes 610 in the battery cell stop 120 allow a wire to be electrically connected to the positive cap 316 of each cell 125. The negative crimp access holes 615 in the battery cell stop 120 allow a wire to be electrically connected to the negative crimp 317 of each cell 125. The positive cap access holes 610 and negative crimp access holes 615 in the battery cell stop 120 align with the positive cap access holes 405 and negative crimp access holes 410 in the thermal shield 115 when the battery cell stop 120 is placed directly on the thermal shield 115. Thus, when the battery cell stop 120 and thermal shield 115 are placed on top of a plurality of battery cells 125, the positive cap access holes 610 and 405 and the negative crimp access holes 615 and 410 allow access to both the positive cap 316 and negative crimp 317 of the battery cell 125. In some embodiments, the positive cap access holes 610 in the battery cell stop 120 are larger in diameter than the positive cap access holes 405 in the thermal shield 115. This allows the thermal shield 115 to deform or yield away from the positive cap 316 of the cell 125 when the thermal shield 115 is clamped between the frame 110 and the battery cell stop 120, as described above with reference to FIG. 4A and FIG. 4B. In some embodiments, mounting holes 630 are formed into the sheet 605. In some embodiments, fasteners such as thread cutting screws are inserted through the mounting holes 630 and are used to secure the battery cell stop 120 to the frame 110. In some embodiments, the mounting holes 630 align with the mounting holes 415 of the thermal barrier 115 such that the fasteners can pass through both the battery cell stop 120 and the thermal barrier 115. In some embodiments, the battery cell stop 120 is implemented as a printed circuit board. The battery cell stop 120 may comprise electrical traces and various microprocessors that electrically interconnect the battery cells 125. The electrical traces and microprocessors of the battery cell stop 120 may also be configured to perform other functions such as monitoring the voltage and temperature of the battery cells 125, balancing the voltage of the battery cells 125, and facilitating communication of the voltage and temperature of the battery cells 125 to an external controller or processor FIG. 6B is an alternate embodiment of the battery cell stop depicted in FIG. 6B. The battery cell stop 120 in FIG. 6B also comprises a flat sheet 605 with mounting holes 630. Cell access holes 625 are formed into the flat sheet 605. Similar to the thermal shield depicted in FIG. 4C, the cell access holes 625 combine the functionality of the positive cap access holes 610 and negative crimp access holes 615 depicted in FIG. 6A.

Figure 7:
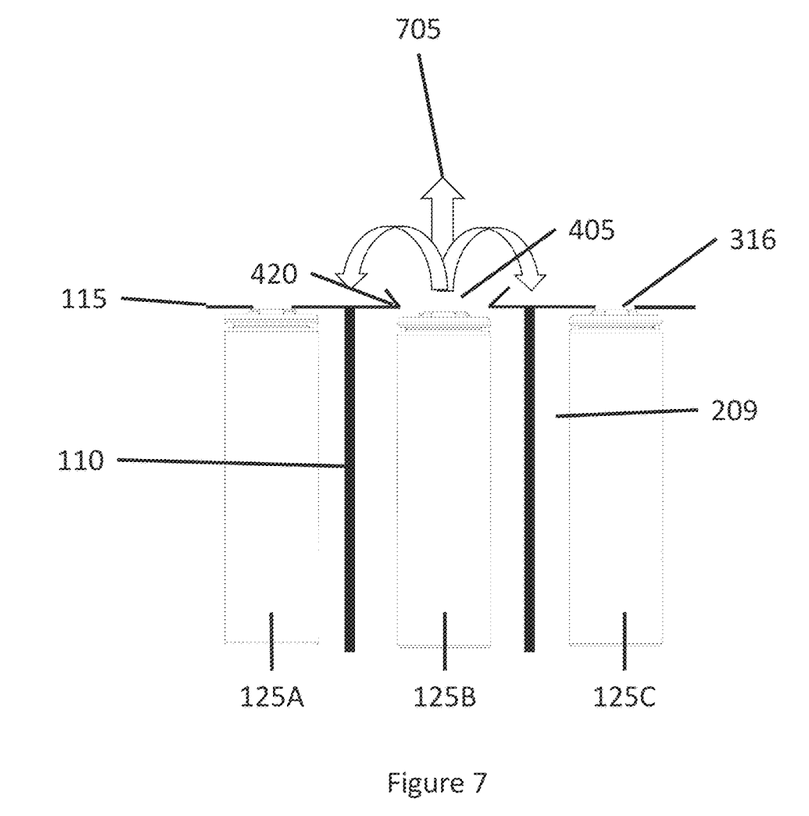
FIG. 7 depicts a battery cell experiencing a thermal event according to one embodiment.

FIG. 7 depicts a battery cell experiencing a thermal event according to one embodiment. Three battery cells 125A, 125B, and 125C are depicted, and cell 125B is experiencing thermal runaway and venting hot gas 705. The cells 125A, 125B, and 125C are separated by the battery module frame 110 and air gaps 209, as described above with reference to FIG. 2A, FIG. 2B, and FIG. 2C. The material of the frame 110 acts as a thermal insulator, in some embodiments. The air gap 209 acts as a further thermal insulator, in some embodiments. The frame 110 and air gap 209 thermally insulate battery cells 125A and 125C from the heat generated by cell 125B. In a normal resting state, the thermal shield 115 and the hole patterns 420 lay flat against the positive caps 316 of the battery cells 125, as depicted above battery cells 125A and 125C. However, when a battery cell 125 experiences thermal runaway and vents hot gas 705, such as battery cell 125B, the hole pattern 420 allows the thermal shield 115 to deform away from the positive cap 316 of the battery cell 125, as shown above battery cell 125B. This allows the vented gas 705 to vent properly away from the cell 125B. However, the hole patterns 420 in the thermal shield 115 remain sealed against the positive caps 316 of the neighboring cells 125A and 125C, protecting the crimp seals 318 (described above with reference to FIG. 3) of cells 125A and 125C from the hot vented gas 705.

What is claimed is:

1. A battery assembly comprising:
   a plurality of battery cells;
   a battery module frame comprising a plurality of battery pockets, each battery pocket including a first end and a second end opposite the first end, and each battery pocket holding at least one of the plurality of battery cells;
   a thermal shield comprising a plurality of hole patterns, the thermal shield covering the first ends of the plurality of battery pockets and mechanically contacting the battery module frame, each of the plurality of hole patterns positioned over a corresponding one of the plurality of battery pockets and configured to vent gas from the battery pocket if a battery cell in the battery pocket undergoes thermal runaway and further configured to restrict gas from entering the battery pocket from other battery pockets; and
   a battery cell stop placed directly on the thermal shield, the battery cell stop including a plurality of hole patterns, each hole pattern of the battery cell stop aligned with a corresponding one of the plurality of hole patterns included in the thermal shield;
   wherein the battery module frame includes a plurality of battery cell stop mounting holes formed between at least two of the plurality of battery pockets and the battery cell stop is mounted to the battery module frame via fasteners inserted into the plurality of battery cell stop mounting holes.

2. The battery assembly of claim 1, wherein each of the plurality of hole patterns includes a hole in the thermal shield and a perforated pattern cut into the thermal shield.

3. The battery assembly of claim 2, wherein the perforated pattern surrounds the hole.

4. The battery assembly of claim 3, wherein each of the plurality of hole patterns further include perforations in the thermal shield extending radially from the perforated pattern towards the hole in the thermal shield.

5. The battery assembly of claim 2, wherein the perforated pattern cut into the thermal shield extends radially from the hole in the thermal shield.

6. The battery assembly of claim 5, wherein each of the plurality of hole patterns further comprises a crease in the thermal shield that surrounds the hole in the thermal shield.

7. The battery assembly of claim 2, wherein a diameter of the hole in the thermal shield is larger than a wire inserted into the hole, the wire connected to a positive terminal of a battery cell.

8. The battery assembly of claim 2, wherein a diameter of the hole in the thermal shield is smaller than a diameter of a positive terminal of the battery cell.

9. The battery assembly of claim 2, wherein the thermal shield further includes a plurality of access holes in the thermal shield, each of the plurality of access holes corresponding to one of the plurality of hole patterns.

10. The battery assembly of claim 9, wherein a diameter of each of the plurality of access holes is larger than a wire inserted in the access hole, the wire connected to a negative crimp of the battery cell.

11. The battery assembly of claim 1, wherein the thermal shield is made of heat and flame resistant material.

12. The battery assembly of claim 1, wherein a diameter of the plurality of hole patterns included in the battery cell stop is larger than a diameter of the plurality of hole patterns included in the thermal shield.

13. The battery assembly of claim 1, further comprising:
   a baseplate placed over the second ends of the plurality of battery pockets and contacting the battery frame module, wherein the baseplate is electrically insulated from the plurality of battery cells.

* * * * *